US006976723B2

(12) United States Patent
Libby

(10) Patent No.: US 6,976,723 B2
(45) Date of Patent: Dec. 20, 2005

(54) TAILGATE ASSEMBLIES

(75) Inventor: Rodney Eugene Libby, 1180 Palms Rd., Columbus, MI (US) 48063

(73) Assignee: Rodney Eugene Libby, Columbus, MI (US)

( * ) Notice: Subject to any disclaimer, the term of this patent is extended or adjusted under 35 U.S.C. 154(b) by 0 days.

(21) Appl. No.: 10/734,716

(22) Filed: Dec. 12, 2003

(65) Prior Publication Data

US 2005/0127701 A1 Jun. 16, 2005

(51) Int. Cl.[7] .............................................. B62D 25/00
(52) U.S. Cl. .......................... 296/50; 296/57.1; 49/386
(58) Field of Search .................... 296/50, 57.1; 49/386

(56) References Cited

U.S. PATENT DOCUMENTS

| | | | | |
|---|---|---|---|---|
| 514,076 | A * | 2/1894 | Hotz | 296/57.1 |
| 2,184,814 | A * | 12/1939 | Nagamatsu | 24/116 R |
| 3,009,732 | A * | 11/1961 | Brown | 296/57.1 |
| 4,143,904 | A | 3/1979 | Cooper et al. | 296/57 A |
| 4,202,578 | A | 5/1980 | Roullier et al. | 296/37.16 |
| 4,691,956 | A * | 9/1987 | Hodge | 296/51 |
| 5,358,301 | A | 10/1994 | Konchan et al. | 296/146.1 |
| 5,988,724 | A | 11/1999 | Wolda | 296/57.1 |
| 6,183,031 | B1 * | 2/2001 | Ballard et al. | 296/57.1 |
| 6,196,609 | B1 * | 3/2001 | Bowers | 296/57.1 |
| 6,550,840 | B2 | 4/2003 | Rayburn | 296/57.1 |
| 2002/0167188 | A1 | 11/2002 | Zagaroff | 296/57.1 |

OTHER PUBLICATIONS

Oberg, Erik, et al., "26th Edition Machinery's Handbook", *Industrial Press Inc., NY*, (2000), 285-332, 492.

* cited by examiner

*Primary Examiner*—Stephen Gordon
(74) *Attorney, Agent, or Firm*—Law Office of Stanley K. Hill, PLC

(57) ABSTRACT

Tailgate assemblies that are easier to use than tailgate assemblies of the prior art are provided. The tailgate assemblies comprise one or more torsion springs having a first leg attached to a tailgate support and a second leg attached to the tailgate. The legs of the torsion spring can be removably attached for easier replacement. The torsion springs are actuated in a winding direction as the tailgate is opened, making the tailgate easier to open and close.

22 Claims, 2 Drawing Sheets

TAILGATE ASSEMBLIES

FIELD OF THE INVENTION

The present invention generally relates to tailgate assemblies, especially those tailgate assemblies typically found on vehicles such as pickup trucks. More specifically, the present invention relates to tailgate assemblies comprising a torsion spring that acts as a counterbalance to the wait of the tailgate, making the opening and closing of the tailgate easier.

BACKGROUND OF THE INVENTION

It is well known in the art that vehicles, such as trucks and station wagons, frequently have a tailgate pivotally mounted between body side panels at the rear of the vehicle. The tailgate typically pivots about a hinge axis between horizontally open and vertically closed positions. The hinge axis typically comprises one or more rods or pins about which the tailgate pivots. For instance, in a pickup truck, a tailgate in the closed or up position serves as the rear wall of the cargo bed of the truck. In the open or down position, the tailgate is out of the way to enable loading and unloading of the cargo bed.

Tailgates for pickup trucks typically range in weight from about 40 pounds to about 70 pounds. Accordingly, the weight of the tailgate precludes one-handed operation for any but the strongest individuals. People of normal or slight build must use their second hand, a shoulder, or a knee to support the tailgate in an effort to keep it from dropping too quickly. The weight of the tailgate can cause an individual to lose control of the tailgate while opening, allowing the tailgate to open rapidly and possibly injure the operator or others standing nearby. Similarly, the existing tailgates can be very difficult to close due to the weight of the tailgate.

The prior art teaches various mechanisms that attempt to counterbalance the weight of a tailgate to make it easier to operate. However, these prior art mechanisms contain numerous parts making them more susceptible to breakdown and making them more expensive to manufacture, repair, and replace.

SUMMARY OF THE INVENTION

The present invention addresses one or more of the deficiencies found in the prior art by providing tailgate assemblies utilizing torsion springs. According to the present invention, a tailgate assembly is provided comprising: a tailgate; a tailgate support; a torsion spring having a first leg attached to the tailgate support and a second leg attached to the tailgate, such that the torsion spring is actuated in a winding direction as the tailgate is opened. That is, the torsion spring is positioned such that opening the tailgate causes the second arm of the spring to deflect in a winding direction, increasing the torque in the spring. The torque in the spring acts to counterbalance the weight of the tailgate, making the tailgate easier to operate. As the tailgate is lowered, the torsion spring is further deflected, increasing the torque in the torsion spring and increasing the counterbalance to the weight of the tailgate. When the tailgate is fully opened the second arm of the torsion spring typically will be deflected approximately 90 degrees from its closed position.

DESCRIPTION OF THE DRAWINGS

The present invention is illustrated by way of example in the following drawings in which like references indicate similar elements. The following drawings disclose various embodiments of the present invention for purposes of illustration only. The drawings are not intended to limit the scope of the invention.

DETAILED DESCRIPTION OF PREFERRED EMBODIMENTS OF THE INVENTION

In the following detailed description of preferred embodiments of the present invention, reference is made to the accompanying Drawings, which form a part hereof, and in which are shown, by way of illustration, specific embodiments in which the present invention may be practiced. It should be understood that other embodiments may be utilized and changes may be made without departing from the scope of the present invention.

The present invention provides for tailgates that are easier to operate than tailgates of the prior art. According to the present invention, a torsion spring is placed between the tailgate and the tailgate support. In one aspect a tailgate assembly is provided comprising: a tailgate; a tailgate support; and a torsion spring having a first leg attached to the tailgate support and a second leg attached to the tailgate. Torsion springs are designed and wound to be actuated rotationally, and to provide an angular return force. According to the present invention, a torsion spring is positioned such that opening the tailgate causes the second leg of the torsion spring to deflect in a winding direction, increasing the torsion in the spring. The torsion in the spring acts to counterbalance the weight of the tailgate, making the tailgate easier to operate. As the tailgate is lowered, the torsion spring is further deflected increasing the torsion in the torsion spring and increasing the counterbalance to the weight of the tailgate. When the tailgate is fully opened the second arm of the torsion spring will be deflected approximately 90 degrees from its closed position. Typically, a torsion spring is positioned between the tailgate and the left-side sidewall. However, additional configurations are contemplated by the present invention.

Figure 1:
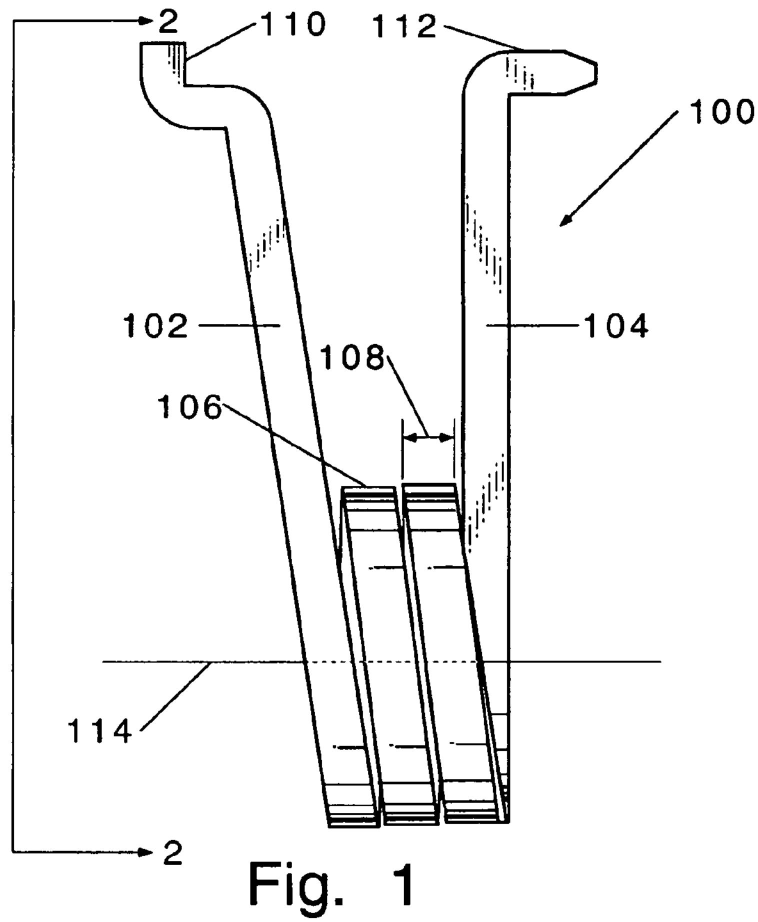
FIG. 1 illustrates a side view of a right-handed torsion spring of the present invention.
Figure 2:
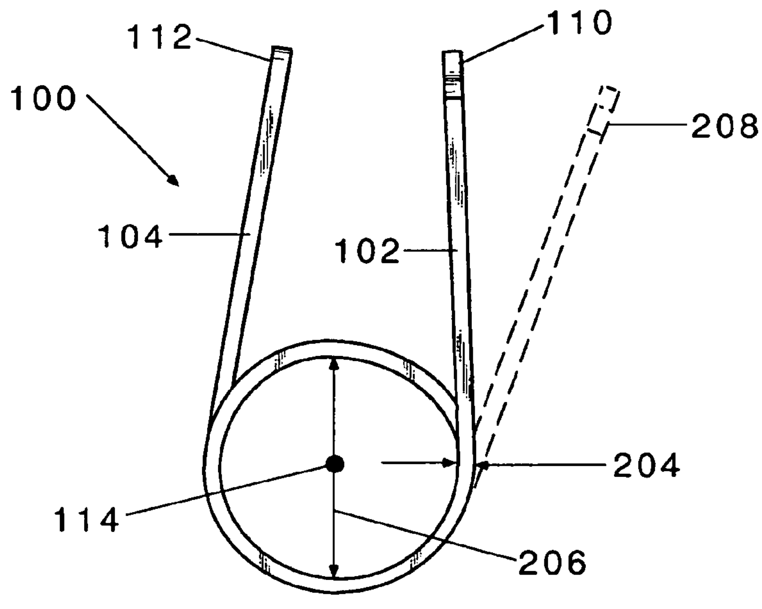
FIG. 2 illustrates a longitudinal view along the axis of the torsion spring illustrated in FIG. 1.

Referring now to the drawings, FIG. 1 illustrates a side view of a right-handed torsion spring 100 of the present invention. FIG. 2 illustrates a longitudinal view along the axis 114 of the torsion spring 100. The torsion spring 100 comprises a first leg 102, a second leg 104, and coils 106. A torsion spring is considered right-handed if the spring is coiled in a clockwise direction going away from a viewer looking down the axis of the spring. Similarly, a torsion spring is considered left-handed if the spring is coiled in a counterclockwise direction going away from a viewer looking down the axis of the spring. The torsion spring 100 comprises approximately 2.5 coils 106. The ends of the legs may be shaped to facilitate the insertion of the leg into a hole on either the tailgate support or the tailgate. For example, the torsion spring 100 of FIG. 1 comprises a first foot 110 corresponding to the first leg 102 and a second foot 112 corresponding to the second leg 104. The first foot 110 is "S-shaped" and the second foot 112 is "L-shaped." When the torsion spring 100 is positioned in accordance with the present invention, the first foot 110 is inserted first into a hole in a tailgate support and the second foot 112 is then inserted into a hole in the tailgate.

For purposes of the present specification, the thickness 204 of the torsion spring will refer to the thickness of the material used to make the torsion spring and the width 108 of the torsion spring will refer to the width of the material used to make the torsion spring. The diameter 206 of the torsion spring refers to the inside diameter of the coils 106.

Figure 3:
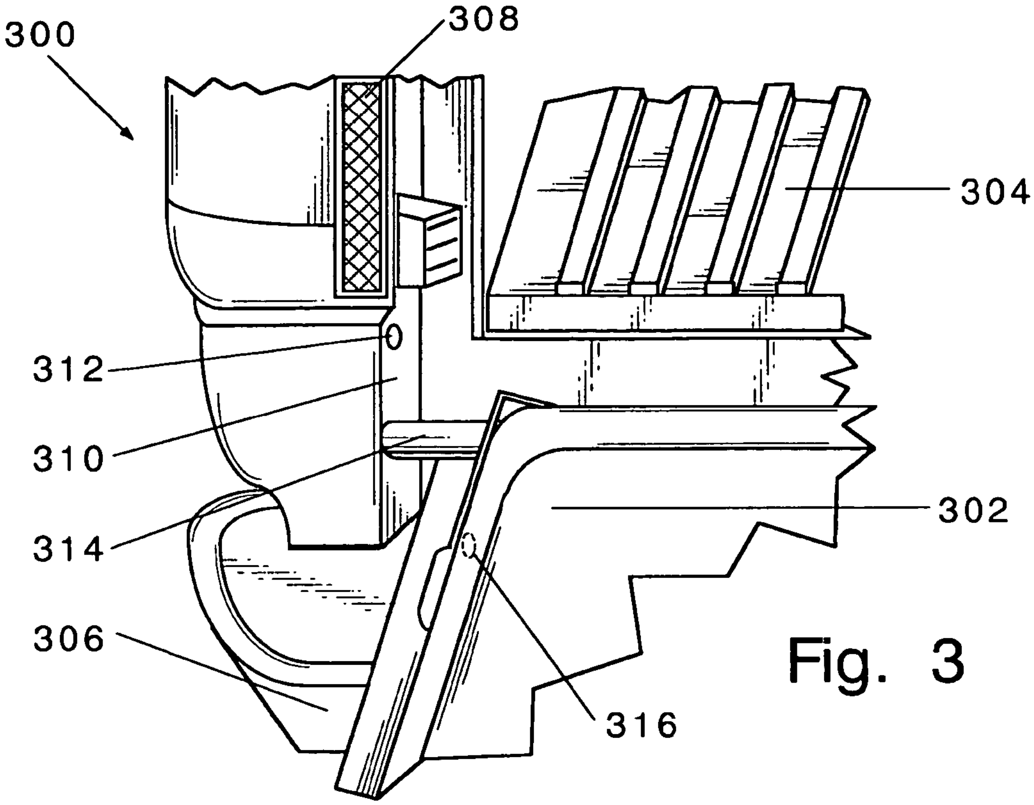
FIG. 3 shows a partial rear-end view of a truck tailgate assembly according to the prior art.

FIG. 3 shows a partial rear-end view of a truck having a tailgate 302 in the open position. FIG. 3 also illustrates the truck bed 304, the rear bumper 306, a rear taillight 308, the left-side sidewall 310 of the truck, a hole 312 in the sidewall 310, a hole 316 in the tailgate 302, and the tailgate rod 314 (also referred to as the tailgate pin). Tailgate rods are known in the art. During the opening and closing of a typical tailgate, the tailgate rotates or pivots about a tailgate axis that is aligned with the rod or rods (as is known in the art). Additionally, some tailgate assemblies may not comprise a rod that attaches to the sidewall, but may comprise a hinge-like mechanism positioned near the center of the tailgate.

The tailgate rotates about the tailgate axis during the opening and closing of the tailgate. Typically, the tailgate axis is horizontal. Although the present specification will primarily describe tailgate assemblies having a horizontal axis, the present invention contemplates tailgate assemblies having a vertical axis. When a tailgate assembly has a horizontal axis, a tailgate in the closed position is approximately vertical. During the opening of the tailgate, the tailgate pivots about the tailgate axis and moves from a vertical closed position to an open position that is approximately perpendicular to the back wall of the vehicle and is approximately parallel to the truck bed and approximately parallel to the ground. Opening a tailgate having a horizontal axis is also commonly referred to as lowering the tailgate.

In accordance with the present invention, the torsion spring is placed such that the tailgate axis about which the tailgate pivots is approximately aligned with the axis of the torsion spring. The first leg of the torsion spring is attached to a tailgate support and the second leg of the torsion spring is attached to the tailgate. When the tailgate is closed, the spring is relaxed and exerts little or no torque on the tailgate. However, as the tailgate is opened the spring is deflected in a winding direction. This deflection creates torque that acts to counter the weight of the tailgate. As the tailgate is lowered it becomes heavier. Thus, the tailgate is heaviest when in a fully opened position. In this position, the tailgate is approximately perpendicular to the back wall of the vehicle and is approximately parallel to the truck bed. As the tailgate moves from its closed position to its fully open position, the spring is increasingly deflected, increasing the torque that acts to counter the weight of the tailgate. Thus, as the tailgate moves from its closed position to its fully open position both the weight of the tailgate increases and the torque countering the weight of the tailgate increase. Accordingly, the weight felt by a person opening or closing the tailgate feels more uniform throughout the motion of opening or closing the tailgate.

Tailgates, such as the ones found on pickup trucks, are generally manufactured in a manner that allows them to be removed. For example, many tailgates can be removed by first opening the tailgate half-way so that the tailgate is in a position that is at approximately a 45 degree angle relative to the back of the truck and then lifting the right side of the tailgate away from the axis of the tailgate. This lifting motion detaches the right side of the tailgate from the tailgate rod on the right side. The tailgate can then be moved to the right (that is, away from the left-side sidewall) to slide the tailgate off of the left-side rod, such as the left-side rod 314 shown in FIG. 3.

One preferable method for installing a torsion spring in accordance with the present invention involves first removing the tailgate (as described above, for example) and then drilling a hole in the tailgate support (for example, hole 312) and drilling a hole in the tailgate (for example, hole 316). The torsion spring is positioned such that the coils of the torsion spring are coiled around the tailgate rod and the foot of the first leg of the torsion spring is inserted into the hole that was drilled into the tailgate support. The tailgate is then placed back on the vehicle by first sliding the tailgate back onto the tailgate rod and then positioning the tailgate at an approximate 45 degree angle to reattach the right side of the tailgate. To finish installing the torsion spring, the tailgate is first put in a position that is almost completely closed and then the foot of the second leg of the torsion spring is inserted into the hole that was drilled into the tailgate. Typically, it is more difficult to maneuver the second leg if the tailgate is completely closed. Once both legs of the torsion spring are attached, the tailgate can be opened and closed just as is done in the prior art, except that the tailgate will appear to the operator to be much lighter.

Figure 4:
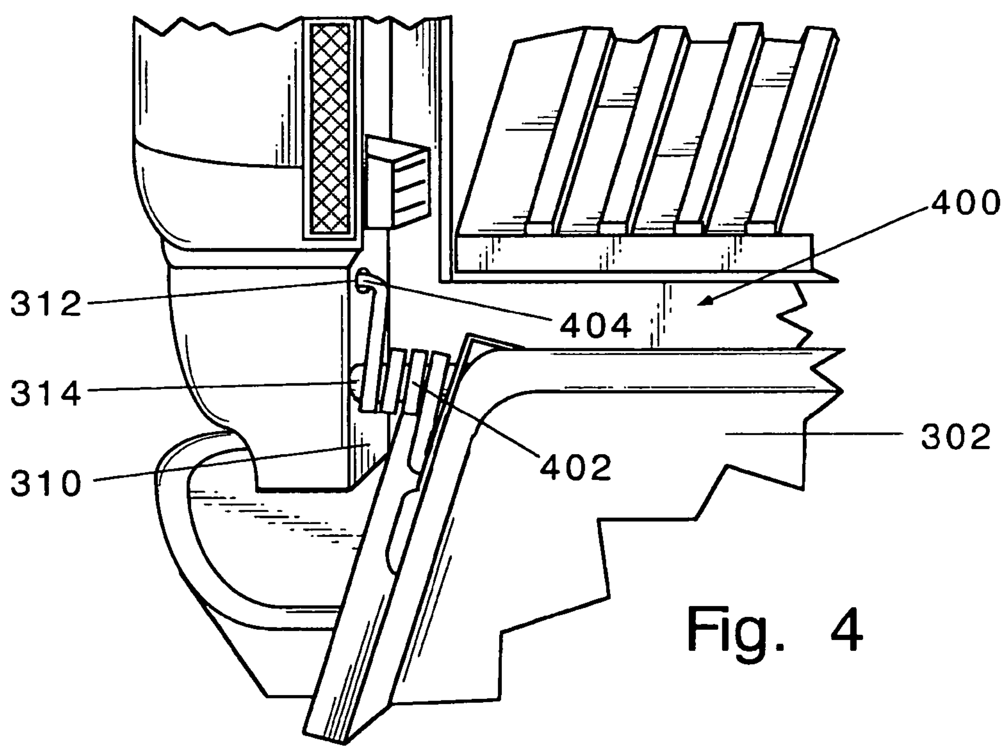
FIG. 4 shows a partial rear-end view of the truck shown in FIG. 3 having a torsion spring positioned in accordance with tailgate assemblies of the present invention.

FIG. 4 shows a partial rear-end view of the truck shown in FIG. 3 having a torsion spring 402 positioned in accordance with the present invention. The torsion spring 402 is positioned such that the torsion spring 402 coils around the tailgate rod 314. Accordingly, the tailgate axis of the tailgate 302 is substantially aligned with the tailgate rod 314. The torsion spring 402 in FIG. 4 is a right-handed torsion spring. The first leg of the torsion spring 402 is removably attached to the left-side sidewall 310. That is, the left-side sidewall 310 is the tailgate support. For purposes of the present invention, the tailgate support is any structure that the first leg of a torsion spring can be attached to such that the first leg remains substantially stationary as the second leg (attached to the tailgate) is deflected in a winding direction. In FIG. 4, the first leg of the torsion spring 402 has been removably attached to the left-side sidewall 310 (that is, the tailgate support) by inserting the foot 404 of the first leg of the torsion spring 402 into the hole 312 in the left-side sidewall 310. Similarly, the second leg of the torsion spring 402 is removably attached to the tailgate 302 by inserting the foot (not shown) of the second leg into the hole 316 (not shown in FIG. 4) in the tailgate 302.

Torsion springs according to the present invention can be removably attached to the tailgate support and the tailgate using alternate methods. For example, the legs of a torsion spring can be bolted to the tailgate support and the tailgate using fasteners or rivets. Additionally, the legs of the torsion spring can be permanently attached by welding, for example, the legs to the tailgate support and the tailgate. When alternate methods are used to attach the legs of torsion springs to the tailgate support or the tailgate, the legs do not necessarily need a foot, but may instead be a straight section of the spring. However, it is preferable for at least one of the legs of a torsion spring to be removably attached to the tailgate support or the tailgate. More preferably, both of the legs of the torsion spring are removably attached. When the legs of a torsion spring are removably attached to the tailgate support and the tailgate, the torsion spring can be easily replaced or removed, if necessary. Torsion springs, in accordance with the present invention, can be installed during the manufacture of a vehicle or can be installed into an existing vehicle.

The tailgate 302 in FIG. 4 is in the open position. The torsion spring 402 has been deflected approximately 90 degrees in the winding direction and now exerts torque against the tailgate 302, countering the weight of the tailgate 302. Accordingly, the tailgate 302 as shown in FIG. 4 is easier to close than the tailgate 302 as shown in FIG. 3. Similarly, when the tailgate is in a closed position, the torsion spring is in a substantially relaxed state and exerts little or no torque on the tailgate.

Torsion springs are generally designed and wound to be actuated rotationally (that is, in the winding direction), and to provide an angular return force (that is, torque). Torsion springs, such as the torsion spring 100 shown in FIGS. 1 and 2, have been made in accordance with the present invention, from high-carbon spring steel in flat strip form. The steel should comprise about 1 percent carbon. Preferably, the steel will comprise at least about 0.96 percent carbon. More preferably, the steel will comprise at least about 0.98 percent carbon. Preferably, the steel will comprise no more than about 0.99 percent carbon. Materials other than high-carbon spring steel flat strips can be advantageously utilized to make torsion springs in accordance with the present invention. For example, torsion springs have been made from music wire (that is, high-carbon spring steels in wire form). Torsion springs made from music wire exhibit less torque than those made from spring steel. Accordingly, torsion springs made from music wire generally are more advantageously utilized in smaller trucks having lighter tailgates. One of ordinary skill in the art of metalworking may also wish to produce torsion springs from other materials such as brass, phosphor-bronze, beryllium-copper, stainless steels, nickel alloys, or allow spring steels such as chromium vanadium, silicon manganese, chromium silicon.

Torsion springs have been advantageously made from high-carbon spring steel flat strips that were about 3 feet (0.9144 meters) in length. If longer spring legs are desired, a longer starting piece of steel can be used. If shorter spring legs are desired, a shorter starting piece of steel can be used. The thickness of the steel strip is preferably from about 3⁄16 of an inch (0.48 cm) to about ½ of an inch (1.27 cm). The width of the steel strip is preferably from about 3⁄16 of an inch (0.48 cm) to about ¾ of an inch (1.91 cm). Generally, increasing the thickness of the starting steel strip increases the torque of the resulting torsion spring. Increasing the width of the starting strip also increases the torque of the resulting torsion spring. For example, a steel strip having a thickness of 3⁄16 of an inch (0.48 cm) and a width of 3⁄16 of an inch (0.48 cm) may be desired for making a torsion spring to be used in conjunction with a lighter tailgate on a smaller truck. Conversely, a steel strip having a thickness of ⅜ of an inch (0.95 cm) and a width of ⅜ of an inch (0.95 cm) may be desired for making a torsion spring to be used in conjunction with a heavier tailgate on a larger truck. The maximum thickness and width may vary from one vehicle to another. For example, on some of the trucks manufactured by the Ford Motor Company ("Ford trucks") the space between the tailgate pin and the tailgate may be at most about 3⁄16 of an inch (0.48 cm). Because the coils of the torsion spring on these trucks must fit between the tailgate pin and the tailgate, the thickness of these torsion springs can not be greater than about 3⁄16 of an inch (0.48 cm). On the other hand, the space between the tailgate pin and the tailgate on many Dodge trucks manufactured by the Chrysler Corporation is about ½ of an inch (1.27 cm). Accordingly, a thicker torsion spring can be used on these Dodge trucks than on the Ford trucks discussed above. Torsion springs having a thickness of about 3⁄16 of an inch (0.48 cm) and a width of about 5⁄16 of an inch (0.79 cm) have been produced and effectively used on Ford pickup trucks (for example the F-250). Torsion springs having a thickness of about ¼ of an inch (0.64 cm) and widths of about ¼ of an inch (0.64 cm) and 5⁄16 of an inch (0.79 cm) have been produced and effectively used on Dodge pickup trucks. Torsion springs having a thickness of about 3⁄16 of an inch (0.48 cm) and a width of about 3⁄16 of an inch (0.48 cm) have been produced and effectively used on both smaller Ford pickup trucks and smaller Dodge pickup trucks.

The torsion springs described above were made from high-carbon spring steel flat strips that were about 3 feet (0.9144 meters) in length. The steel strips were each wound to have approximately 2.5 coils, each coil having a diameter of about 1⅞ inch (4.76 cm). The steel strips can be wound in any manner known in the art of metalworking. The torsion springs made from high-carbon spring steel flat strips described above were wound using a Compact Bender Model 2800-0370 (available from Rich Honest Machine and Tool Manufacturing Company). When the steel is initially wound the legs will initially be in a position similar to the position of the second leg 104 and the first leg 208 of the torsion spring 100 shown in FIG. 2. After the torsion spring is initially deflected, the legs do not unwind all the way back to their initial position. Thus, the first leg 102 of the torsion spring 100 shown in FIG. 2 illustrates the position of the first leg 102 after the torsion spring has been deflected one or more times. Repeated deflections after the initial deflection do not alter the relative positions of the legs of the torsion spring.

Once the steel strips have been wound into coils, the legs can be shortened, if necessary, and the ends of the legs can be formed into feet, if necessary. The legs on the torsion springs described above for Ford and Dodge trucks were shortened such that the distance between the feet and the axis of the torsion spring was about 2¾ inches (6.99 cm). After the torsion springs have been formed, they are preferably hardened and tempered in any manner known in the art of metalworking. The torsion springs made from high-carbon spring steel flat strips described above were heat treated and quenched in a process known in the art as an austemper heattreat process. The torsion springs, after being formed, were first heated to a temperature of about 1600° F. (871° C.) for about 30 minutes and then quenched in molten salt at a temperature of about 650° F. (343° C.) for about 45 minutes. Preferably, the heat-treated steel will have a hardness of at least about 42 Rockwell C. More preferably, the steel will have a hardness of at least about 43 Rockwell C. Preferably, the steel will have a hardness of no more than about 46 Rockwell C. More preferably, the steel will have a hardness of no more than about 45 Rockwell C.

The present invention provides for tailgate assemblies that are easier to use than tailgate assemblies of the prior art. The tailgate assemblies comprise one or more torsion springs having a first leg attached to a tailgate support and a second leg attached to the tailgate. The torsion spring is actuated in a winding direction as the tailgate is opened, making the tailgate easier to open and close. While the present invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and by equivalents thereto.

What is claimed is:

1. A tailgate assembly, comprising:

a tailgate;

a sidewall; and a torsion spring having coils and having a first leg attached to the sidewall and a second leg attached to the tailgate, such that the torsion spring is actuated in a winding direction as the tailgate is opened.

2. A tailgate assembly according to claim 1, wherein either the first leg, the second leg, or both legs of the torsion spring are removably attached.

3. A tailgate assembly according to claim 1, wherein the torsion spring comprises about 2.5 coils.

4. A tailgate assembly according to claim 1, wherein the thickness of the torsion spring is at least about 3/16 of an inch.

5. A tailgate assembly according to claim 1, wherein the width of the torsion spring is at least about 3/16 of an inch.

6. A tailgate assembly according to claim 1, wherein the torsion spring comprises a high-carbon steel.

7. A tailgate assembly according to claim 6, wherein the high-carbon steel comprises about 1 percent carbon.

8. A tailgate assembly according to claim 6, wherein the high-carbon steel comprises from about 0.96 to about 0.99 percent carbon.

9. A tailgate assembly according to claim 6, wherein the high-carbon steel has a hardness from about 42 to about 46 Rockwell C.

10. A tailgate assembly according to claim 6, wherein the high-carbon steel has a hardness from about 43 to about 45 Rockwell C.

11. A tailgate assembly, comprising:

a tailgate;

a sidewall;

a rod connected to the tailgate, such that the tailgate pivots about the rod to open and close; and a torsion spring having coils around the rod and having a first leg attached to the sidewall and a second leg attached to the tailgate, such that the torsion spring is actuated in a winding direction as the tailgate is opened.

12. A tailgate assembly according to claim 11, wherein either the first leg, the second leg, or both legs of the torsion spring are removably attached.

13. A tailgate assembly according to claim 11, wherein the torsion spring comprises about 2.5 coils.

14. A tailgate assembly according to claim 11, wherein the thickness of the torsion spring is at least about 3/16 of an inch.

15. A tailgate assembly according to claim 11, wherein the width of the torsion spring is at least about 3/16 of an inch.

16. A tailgate assembly according to claim 11, wherein the torsion spring comprises a high-carbon steel.

17. A tailgate assembly according to claim 16, wherein the high-carbon steel comprises about 1 percent carbon.

18. A tailgate assembly according to claim 16, wherein the high-carbon steel comprises from about 0.96 to about 0.99 percent carbon.

19. A tailgate assembly according to claim 16, wherein the high-carbon steel has a hardness from about 42 to about 46 Rockwell C.

20. A tailgate assembly according to claim 16, wherein the high-carbon steel has a hardness from about 43 to about 45 Rockwell C.

21. A tailgate assembly, comprising:

a tailgate having a hole;

a tailgate support having a hole; and a torsion spring having coils and having a first leg inserted into the hole of the tailgate support and a second leg inserted into the hole of the tailgate, such that the torsion spring is actuated in a winding direction as the tailgate is opened.

22. A tailgate assembly according to claim 21, wherein the tailgate support is a sidewall.

* * * * *